July 31, 1934.   R. SAVY   1,968,711
METHOD AND APPARATUS FOR VIBRATING
Filed July 17, 1931   3 Sheets-Sheet 1

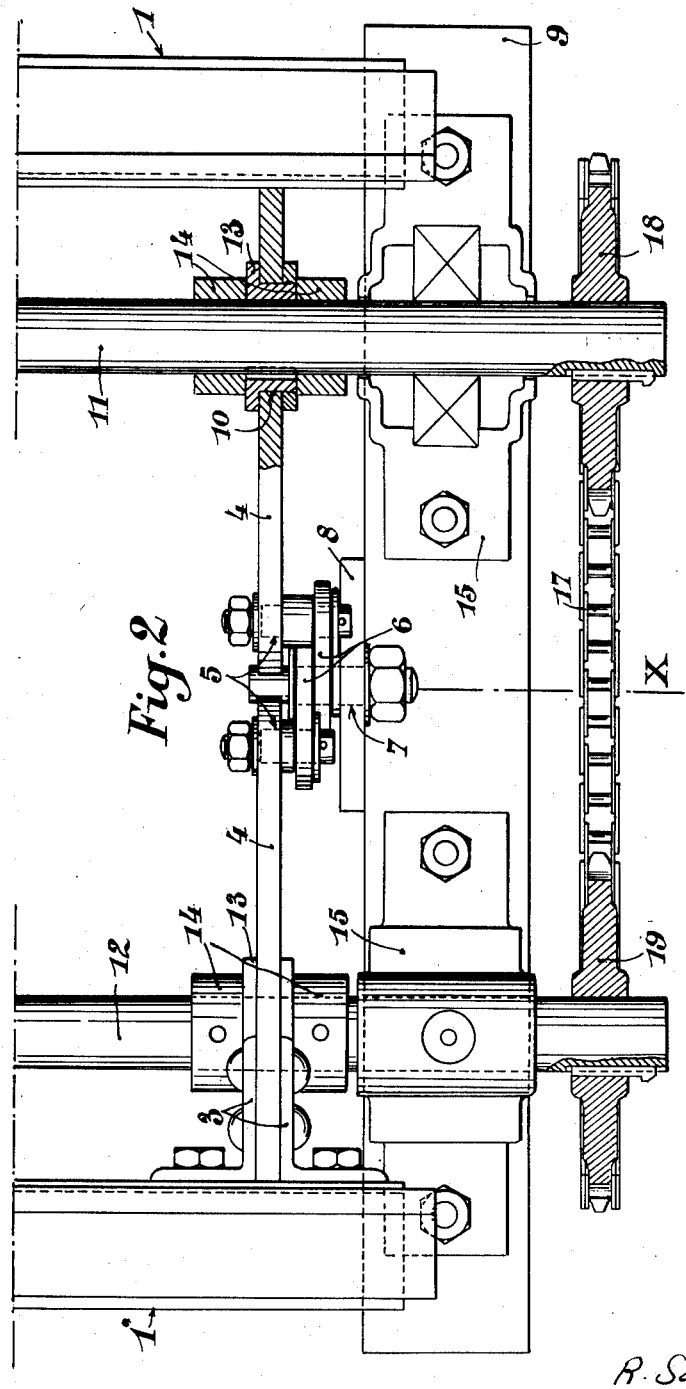

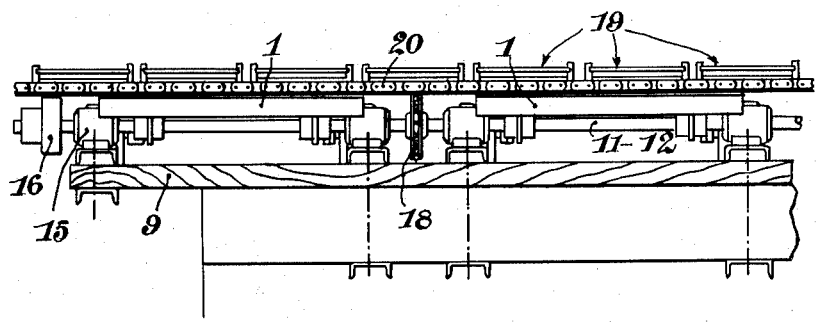
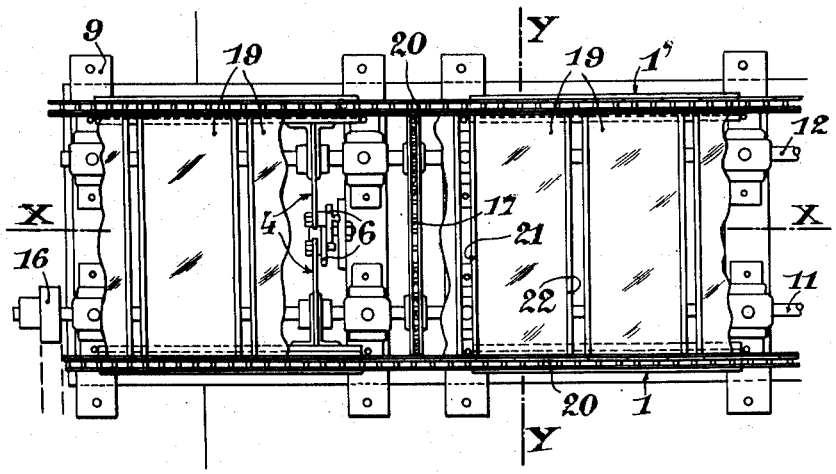

UNITED STATES PATENT OFFICE 1,968,711

METHOD AND APPARATUS FOR VIBRATING

Robert Savy, Courbevoie-Seine, France, assignor to Anciens Etablissements A. Savy Jeanjean & Cie, Courbevoie, Seine, France, and Baker Perkins, Limited, London, England Application July 17, 1931, Serial No. 551,540
In France April 23, 1931

14 Claims. (Cl. 259—1)

This invention relates to methods of and means for vibrating articles or appliances and has more particular reference to appliances known as vibrating tables which are employed, for example, for spreading a material such as chocolate (or like liquid or semi liquid), in a mould for casting purposes, or boot or other polish in tins. In connection with such appliances the chocolate is poured into the moulds, sometimes locally and sometimes so as to distribute the chocolate, but in each case it is necessary to spread the chocolate over the whole mould, this being effected by the vibrating tables.

In known vibrating tables the vibration is uniformly and continuously imparted to the moulds and material therein with the result that the chocolate in the moulds, when such arrive on the vibrating table, spreads out more or less suddenly, but this spreading action lasts only for a short time although the material continues to spread to a certain extent very slowly.

The object of the present invention is to provide an improved method of and means for vibrating appliances and in particular moulds for chocolate and the like so that the spreading action is facilitated and improved in that a higher rate of spreading is maintained throughout the treatment.

The invention broadly consists in creating pulsations in the vibrations imparted to the chocolate or material or, in other words, constantly causing changes to occur in the amplitude of the vibrations.

According to the invention the amplitude of the vibration fluctuates and may progress from a maximum to a minimum or to a state of cessation of vibration and then increase again, the effect aimed at being to prevent the chocolate or material simply taking up the vibrational movements of the mould instead of the vibrations causing, with respect to the inertia of the chocolate, relative movement between the mould and the chocolate.

A feature of the invention lies in producing progressively or periodically an out-of-phase relationship in the movements of two parts or opposite sides of a vibrating table during a given cycle. In this way a kind of vibration is obtained which is analogous to that which is carried out by hand, that is to say, successive horizontal vibratory movements and vibratory movements with supplemental oscillations along an axis of the mould placed on the table and interruptions in the vibrations between the successive phases. According to one embodiment, two opposite sides of the table are connected to devices which give them vertical reciprocating motions of very slightly different frequencies. The amplitude of these movements is preferably very small (less than or at the most equal to a millimetre for example).

The vibrational movements may be imparted by eccentrics mounted on shafts geared together in such a manner that the phases of the eccentrics progressively vary one with respect to the other.

In the accompanying drawings, which are given simply by way of example:

Fig. 1 is an elevation of a vibrating table according to the invention.

Figure 2 is a plan view with parts cut away.

Figure 3 is a perspective view of one of the eccentrics producing the vertical reciprocating movements.

Figure 4 is an elevation of a portion of a chocolate machine having a plurality of vibrating tables according to the invention.

Figure 5 is a corresponding plan view with parts cut away.

In the constructional example shown in Figures 1 and 2, the table is formed by two longitudinal angle or other shaped iron sections 1 and 1' upon the upper faces 2 of which are carried the mould frames or other devices to be vibrated. At each of its ends, each angle iron 1 and 1' is rigidly secured by means of angles 3 or otherwise to a member 4 forming a lever. Each member 4 is pivoted at its other end at 5 to a link 6. The two links 6 at each end of the table are loosely mounted on a shaft 7 carried by a bracket 8 mounted on the frame 9.

Each lever member 4 bears upon an eccentric cylindrical seating 10 formed upon a sleeve. The sleeves are keyed upon two shafts 11 and 12 and each lever 4 is prevented from moving longitudinally by means of shoulders 13. One of these shoulders can form part of the sleeve while the other is mounted on it. The sleeve itself is prevented from making any axial movement by means of rings 14 pinned to the shaft.

The two shafts 11 and 12 are parallel. They are carried by means of bearings 15 on the frame 9. One of these shafts, for example the shaft 11, is driven in any manner, for example by a pulley 16, (Figures 4 and 5).

The other shaft 12 is driven by the shaft 11 through a chain 17 and sprocket wheels 18 and 19, (Figures 2, 4 and 5) keyed on these shafts. The number of teeth (N and N') on these sprocket wheels differ from one another for example by one tooth. Thus the sprocket 18 may have sixteen teeth and the sprocket 19 fifteen teeth.

Obviously, this table can serve for vibrating articles of various kinds. By way of example, and in order to make its advantages clear, it has been assumed that this table is adapted to carry a plurality of moulds 19, (Figs. 1, 4 and 5). These moulds 19, which are intended for example for moulding chocolate or other analogous articles, are carried by two endless chains 20, whereby the moulds are adapted for continuous movement in an endless path. The chains 20 move over the other surfaces 2 of a number of vibrating tables arranged one after the other, (Figures 1, 4 and 5).

Each of these tables is supported in the manner described above, the shafts 11 and 12 being continuous.

The operation of a vibrating table is as follows:

It is assumed that to commence with the eccentrics 10 are keyed on the two shafts 11 and 12 in an identical manner.

Naturally, the setting of the two eccentrics keyed on the same shaft at the two ends of the table remain in phase during the whole operation. On the other hand, if N and N' are the numbers of teeth of the sprocket wheels 18 and 19 and are such that $N-N'=1$, the shaft 12 would advance $$\frac{1}{N}$$

of a turn with respect to the shaft 11 for each revolution of the shafts, and at the end of $$\frac{N'}{2}$$

turns, the shaft 12 will have advanced half a turn with respect to the shaft 11. The advance amounts to one complete turn at the end of N' revolutions. It is thus seen that during a cycle of N' turns each of the shafts produces N' vertical displacements of the corresponding edges 1 and 1' of the table; but these displacements, which are in agreement at the commencement of the cycle, move out of phase until the edge 1' is at the bottom dead point when the edge 1 is at the top dead point, and vice versa, and then return finally into agreement at the end of the cycle.

A new cycle will then commence and so on. For each cycle, in addition to these N' displacements in height, the table thus oscillates first in one direction and then in the other about its longitudinal axis X X.

With regard to the moulds 19 placed on this table, these are projected into the air and fall again for each vertical displacement of the table. When the two edges 1 and 1' of the table make simultaneous displacement in the same direction, the vertical displacements of the mould have a certain amplitude which is much smaller, as proved by experience, than when the displacements of the two edges of the table are in opposite directions.

Experience has shown that the moulds appear to remain periodically almost stationary, these periods of relative rest being followed by periods during which they undergo large vibrations.

Thus, each mould is subjected to oscillations similar to those which would be given to it by hand, that is to say rapid vertical reciprocations followed by periods of rest.

It is found that the paste placed in the recesses of the moulds spreads much more effectively and that each recurrence of the vibrations after each pulsation produces on this paste, and in exactly similar proportions, the great spreading effect which is produced when the mould enters a table which is subjected to the usual uniform vibrations.

Further, in the period of phase displacement of the vibrations of the two sides of the table, a slight to-and-fro transverse movement of the moulds 19 is produced. This produces a displacement of the paste in its recess which considerably assists in removing bubbles of air from the paste as has been shown by experience.

The invention is in no way limited to the form of construction and the application shown and described, which have only been chosen by way of example.

The two shafts 11 and 12, for example, may be both driven by an auxiliary driving shaft and may turn either in the same direction or in opposite directions.

Having now described my invention what I claim as new and desire to secure by Letters Patent is:

1. A vibrating appliance comprising a movable carrier for the objects to be vibrated and actuating means for said carrier, said actuating means including two driving shafts, means for rotating said shafts at angular speeds slightly differing from each other and at least two mechanical contrivances operatively connecting said shafts to opposite points of the carrier respectively for transforming the rotary motion of said shafts into reciprocating movements of said points of the carrier whereby said opposite points of the carrier have slightly different frequencies during a given cycle.

2. A vibrating appliance comprising a movable carrier for the objects to be vibrated and actuating means for said carrier, said actuating means including two driving shafts, one of said shafts to drive the other through the medium of a positive gear, the gear ratio slightly differing from unity, whereby the shafts rotate at angular speeds slightly differing from each other and at least two mechanical contrivances operatively connecting said shafts to opposite points of the carrier respectively for transforming the rotary motion of said shafts into reciprocating movements of said points of the carrier whereby said opposite points have slightly different frequencies of movement during a given cycle.

3. A vibrating appliance comprising a movable carrier for the objects to be vibrated and actuating means for said carrier, said actuating means including two driving shafts, means for rotating said shafts at angular speeds slightly differing from each other, said actuating means including further an auxiliary shaft and gearing connecting said auxiliary shaft to both said driving shafts, the gear ratios of said gearing slightly differing from each other, and at least two mechanical contrivances operatively connecting said shafts to opposite points of the carrier respectively for transforming the rotary motion of said shafts into reciprocating movements of said points of the carrier, whereby said opposite points of the carrier have slightly different frequencies during a given cycle.

4. A vibrating appliance comprising a movable carrier for the objects to be vibrated, actuating means for changing the frequencies of the vibrations in one side of the carrier with respect to opposite sides of said carrier during a given cycle, said actuating means including at least one driving device for each of said both opposite sides of the carrier, said driving device comprising an eccentric plate journaled in a side plate rigidly secured to the carrier, a link pivoted at one end of said plate and at the other end to a fixed pivot, and means for rotating said eccentric plate.

5. A vibrating appliance comprising a traveling carrier, a pair of rotating shafts, an eccentric on said shafts, a plate operatively connected to said eccentric, one end of said plate connected to said traveling carrier, the other end of said plate connected by links to a fixed shaft, means to rotate one of said shafts at a different speed from the other shaft, whereby the frequency of vibration produced at one side of said carrier is different from the frequency produced on the other side of said carrier during a given cycle.

6. A vibrating appliance comprising a support for a traveling carrier, a pair of rotating shafts, eccentrics carried by said shafts, plates operatively connected to the said eccentrics, one end of said plates connected to said support, the other end of said plates connected by links to a fixed pivot, means for driving said shafts at slightly different speeds whereby frequencies of vibrations produced in one side of the carrier are different from the frequencies produced in the other side of the carrier during a predetermined cycle.

7. A method of spreading and settling a fluid paste in molds which consists in periodically reciprocating said paste and gradually changing the frequencies of reciprocations in one portion of the paste in respect to another portion of the paste whereby the paste is alternately vibrated and oscillated during a given cycle.

8. A method of spreading and settling a fluid paste in molds which consists in vertically reciprocating said paste and gradually changing the frequencies of the vertical reciprocations in one portion of the paste with respect to another portion of the paste whereby the paste is alternately vibrated and oscillated during a given cycle.

9. A method of spreading and settling a fluid paste in molds which consists in producing reciprocations in at least two portions of the paste and in gradually changing the frequencies of reciprocation in one portion of the paste with respect to another portion of the paste whereby the paste is caused to alternately be vibrated and oscillated during a given cycle.

10. A method of spreading and settling a fluid paste in molds which consists in vertically reciprocating at least two portions of said paste and in gradually changing the frequencies of the reciprocation in one portion of the paste with respect to the vertical reciprocations produced in another portion of the paste whereby the paste is alternately vibrated and oscillated during a given cycle.

11. A vibrating appliance comprising a support for the object to be vibrated, means for vibrating at least two sides of said support in cycles of predetermined frequencies including means for changing the frequencies of one of said vibrating means with respect to the other vibrating means during a given cycle.

12. A vibrating appliance comprising two objects to be vibrated, means for vibrating at least two sides thereof in cycles each of predetermined frequencies, including means arranged to produce periodically out-of-phase vibrations in one of said vibrating means with respect to the other vibrating means during a given cycle.

13. A vibrating appliance comprising a plurality of objects to be vibrated, a support therefor, each object having means to periodically raise and lower two opposite sides thereof at predetermined frequency cycles, and a plurality of actuating means for said raising and lowering means one of said actuating means traveling at a greater speed than the other actuating means whereby the frequencies of raising and lowering of one side is slightly different from the raising and lowering of the other side during a given cycle.

14. A vibrating appliance comprising a movable carrier for the objects to be vibrated, vibrating means for said carrier, said vibrating means being connected to opposite points of the carrier and actuating means for said vibrating means arranged to cause one of said vibrating means to perform vertical reciprocating movements of slightly different frequencies with respect to the other vibrating means during a given cycle.

ROBERT SAVY.